United States Patent [19]

Lequime

[11] Patent Number: 4,867,565
[45] Date of Patent: Sep. 19, 1989

[54] OPTO-ELECTRONIC DETECTION DEVICE FOR REMOTELY DETECTING A PHYSICAL MAGNITUDE

[75] Inventor: Michel Lequime, Equilles, France

[73] Assignee: Bertin & Cie, Plaisir, France

[21] Appl. No.: 127,900

[22] PCT Filed: Mar. 13, 1987

[86] PCT No.: PCT/FR87/00073
§ 371 Date: Nov. 12, 1987
§ 102(e) Date: Nov. 12, 1987

[87] PCT Pub. No.: WO87/05691
PCT Pub. Date: Sep. 24, 1987

[30] Foreign Application Priority Data

Mar. 13, 1986 [FR] France .............................. 86 03598

[51] Int. Cl.[4] .............................................. G01B 9/02
[52] U.S. Cl. ..................................... 356/351; 356/346
[58] Field of Search ......................... 356/351; 351/346

[56] References Cited

U.S. PATENT DOCUMENTS 4,320,973  3/1982  Fortunato et al. .................. 356/346

FOREIGN PATENT DOCUMENTS 2340540  9/1977  France .
2569001  2/1986  France .

OTHER PUBLICATIONS

Optics Letters, vol. 11, No. 8, Aug. 1986, "Fiber-Optic Angular Sensor with Interleaved Channel Spectra".

Primary Examiner—Vincent P. McGraw
Assistant Examiner—S. A. Turner
Attorney, Agent, or Firm—Dennison, Meserole, Pollack & Scheiner

[57] ABSTRACT

A spectrum modulation encoding sensor subjected to the physical magnitude to be measured is connected by an optical fiber to a source of incoherent light, and by an optical fiber to a static demodulation system comprising a set of birefringent elements producing a birefringence gradient along a privileged optical direction x; the system demodulates the signal provided by the sensor optically by means of a Fourier transform.

16 Claims, 3 Drawing Sheets

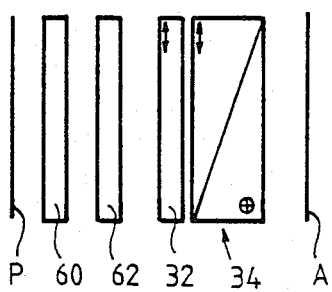
FIG. 8
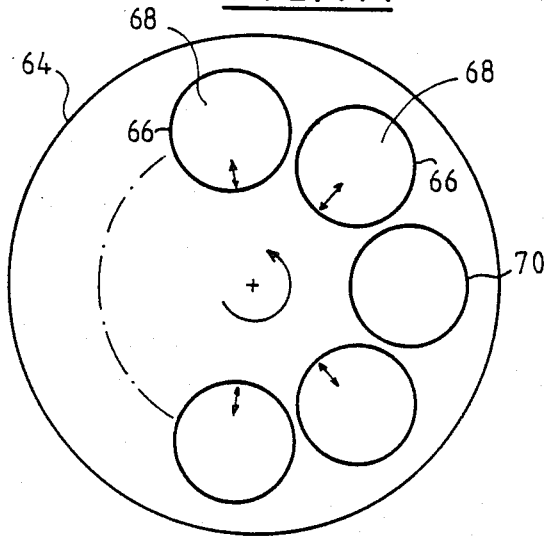
FIG. 9A
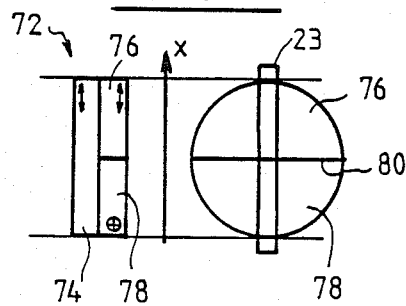
FIG. 9B
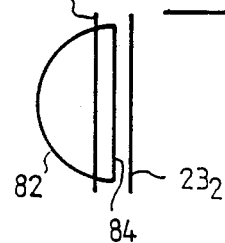
FIG. 9C
FIG. 10
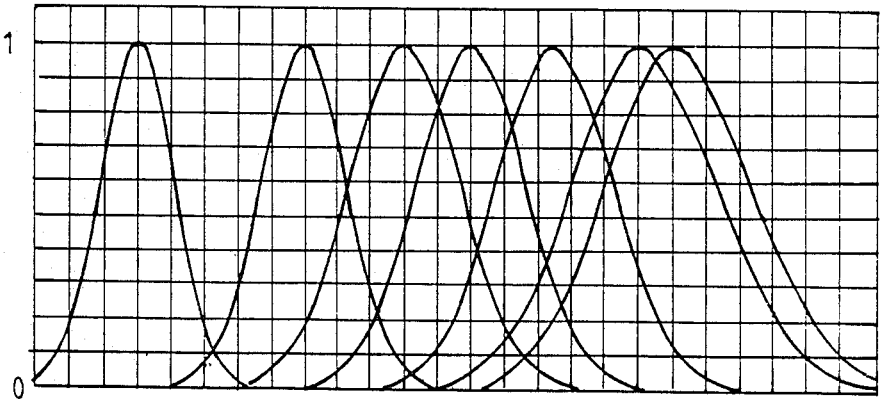

OPTO-ELECTRONIC DETECTION DEVICE FOR REMOTELY DETECTING A PHYSICAL MAGNITUDE

BACKGROUND OF THE INVENTION

1. Field of the Invention

The invention relates to an opto-electronic detection device for remotely detecting a physical magnitude, the device including a source of incoherent light connected via an optical cable to a spectrum modulation encoding sensor which is itself connected via an optical fiber to spectrum analyzer means for analyzing the spectrum of the light coming from the sensor.

In order to measure a displacement by optical means with high accuracy, it is known to use a Michelson interferometer illuminated with monochromatic light (a helium-neon laser) together with a fringe-counting electronic system. This apparatus suffers from the drawback of providing displacement measurements only, rather than position measurements. In order to know the position of an object, it is therefore necessary to keep track of all of its displacements from its starting point to its finishing point. Any interruption in the light beam therefore leads to a complete loss of the origin, and thus makes the measurement valueless.

It has been shown that replacing the coherent monochromatic light source with an incoherent polychromatic light source makes it possible to remedy this drawback (article by Bosselmann, Ulrich and Arditty entitled "Capteur de déplacement à interféromètres couplés par fibres multimodales" (i.e. displacement sensor using interferometers which are coupled by multimode fibers) published in Opto 85, 21/23 May 1985. For detection purposes, the device described in this article uses a second Michelson interferometer whose path length difference is made variable by displacing a mirror. Measurement thus consists in setting the detection interferometer about zero path length difference (zero order correlation peak), and then in varying the position of the moving mirror until the path length difference in the detector is comparable in absolute value to that recorded by the sensor (correlation peaks of order plus or minus one).

If the full accuracy of the method is to be retained, it is necessary to measure the position of the moving mirror to very high accuracy. In the article mentioned, this is done by using a helium-neon laser at the detector operating as a fringe-counting device. This method suffers from the drawback of returning at the detector to the limitations related to using a monochromatic source (i.e. to the relative nature of the measurements).

Further, interferometer devices using space division of the wavefront, such as a Michelson interferometer, are difficult to make, in particular for use with polychromatic light. They require the use of very severe manufacturing tolerances, stabilities, and optical quality.

The use of such a system as the sensor portion of the device can only be justified in the special case of displacement measurements. This system is not appropriate for measuring other physical magnitudes such as temperature, magnetic field, or electrical voltage, since it is difficult to escape from interfering effects related to the structure of the sensor or to cross dependencies between the mangitudes (as applicable to temperature and magnetic fields, for example).

It is also known, from French patent No. 2 436 976, to measure temperature remotely by means of an opto-electronic device including an incoherent light source connected by an optical fiber to a sensor which includes a birefringent element which is sensitive to the physical magnitude to be measured, together with means for analyzing the light signal coming from the sensor and serving to transform said signal into a light signal whose intensity is a sinusoidal function of time having peaks which are separated by time intervals which are a function of the detected temperature. This light signal is transformed by a photodiode into an electrical signal from which the DC component is removed and which is transformed into a squarewave whose period, representative of the detected temperature, is then measured. In order to obtain proper accuracy, two counters must be used in order to perform the measurement over a predetermined number of periods.

The major drawback of this known device is being capable of operating with only one sensor, and thus being capable of measuring temperature at only one given point if it is desired to use an optical connection line.

One of the aims of the invention is to avoid the drawbacks of various known devices.

SUMMARY OF THE INVENTION

The present invention provides a device for remotely detecting a physical magnitude, which device is simple, stable, compact, easy to manufacture, and has a wide bandwidth.

The invention also provides a device of this type enabling a physical magnitude to be measured at different points by multiplexing birefringent interferometer sensors using spectrum modulation encoding.

The invention therefore provides an opto-electronic detection device for remotely detecting a physical magnitude, the device comprising a source of incoherent light connected via an emission optical fiber to a sensor of the interferometric type having a birefringent active medium which is subjected to the magnitude to be detected and in which light is subjected to periodic or quasi-periodic modulation of its spectrum, and a reception optical fiber connecting the sensor to spectrum analyzer means for analyzing the spectrum of the light from the sensor, the device being characterized in that the path length difference introduced in the sensor between the interfering waves is greater than the coherence length of the light source, and in that the spectrum analyzer means comprise a static optical demodulation system essentially constituted by a set of birefringent elements placed between a polarizer and an analyzer which are crossed or parallel, thereby obtaining a birefringence gradient along a privileged optical direction, a multipoint linear detector having photosensitive elements and oriented parallel to the optical direction, and electronic circuits for acquiring and processing the signals produced by the detector.

The device in accordance with the invention has the advantage of using purely static and optical means for demodulating the light flux from the sensor by the Fourier transform. Three responses of spatial extent inversely proportional to the spectrum width of the light source are thus obtained, said responses being centered on the path length differences 0, +d, and −d. The position of the 0 response is related solely to the instantaneous operation of the demodulation system and serves to determine a detection zero, whereas the relative positions of the +d or −d lateral responses give access to the instantaneous path length difference in the sensor and thus to the value of the physical magnitude to be measured. The device in accordance with the invention which makes it possible to obtain the entire ±1 order correlation peak in a single operation is characterized by its simplicity and by a high degree of measurement accuracy.

According to another characteristic of the invention, the set of birefringent elements in the demodulation system comprises a Wollaston prism constituted by two elementary birefringent prisms stuck together along a face which slopes relative to the above-mentioned privileged direction and disposed in crossed manner, together with a plate of birefringent material identical to that of the modulation sensor and placed between the polarizer and the Wollaston prism.

In this manner, the path length difference in the demodulation system is comparable to the path length difference in the sensor, and the multipoint linear detector makes it possible to record the shape and position of the +d lateral response in static manner, thereby giving access in entirely static manner to the value of the magnitude to be measured.

In a variant, the demodulation system may comprise a modified Wollaston prism (of the Nomarski type), in which one of the elementary prisms is cut to have an axis which slopes relative to its inlet face, thereby obtaining a field of rectilinear interference fringes located outside the Wollaston prism on the linear detector. This avoids the need for using correction optics between the analyzer and the detector.

In another variant, both elementary prisms have the same orientation and they are separated by a halfwave plate, thereby obtaining a large-field device making it possible to use short focal length collimator optics.

In another variant of the invention, a phase modulation device is inserted in the modulation system between the polarizer and the birefringent plate followed by the Wollaston prism. Such a device makes it possible to measure the absolute phase of the signal at any point and to obtain extremely high accuracy in the measurement of the physical magnitude. This phase modulation device may comprise a rotating halfwave plate followed by a fixed quarterwave plate, or else a set of n phase-shifting plates having an increment of $2\pi/n$, together with means for causing these plates to move one after the other between the polarizer and the birefringent plate of the demodulation system.

According to another characteristic of the invention, the device includes a plurality of modulation encoding sensors connected via optical fibers to a common optical demodulation system and multiplexed by the optical path length differences they give rise to together with a set of birefringent plates indentical to those in the sensors and placed in the demodulation system between the polarizer and the birefringent gradient assembly and associated with means for causing the plates to move one after the other between the polarizer and the assembly.

This device makes it possible, with respect to each sensor, to provide static demodulation of the signal coming from the sensor, thus measuring the value of the physical magnitude at the point where the sensor is situated.

As for the light source used, it may be constituted by a filament lamp when it is desirable to have large spectrum width, or else by a light-emitting diode (LED) when it is desired to have a source of narrower spectrum width, or indeed by superposing a plurality of LEDs of different central wavelengths and associated with means for adjusting the diode feed currents if it is desired to have a source of modulatable spectrum width.

BRIEF DESCRIPTION OF THE DRAWING

The invention will be better understood and other characteristics, details, and advantages thereof will appear on reading the following explanatory description given with reference to the accompanying drawings, in which:

FIG. 8 is a diagram of a phase modulation device used in a first embodiment system in accordance with the invention;

FIG. 9A is a diagram of a disk bearing a series of tuning plates suitable for interrogating a plurality of sensors using spectrum modulation encoding;

FIGS. 9B and 9C are diagrams of variant embodiments of these tuning plates; and

FIG. 10 is a graph showing the relative spectral densities of a plurality of LEDs as a function of wavelength.

DESCRIPTION OF THE PREFERRED EMBODIMENTS

The accompanying drawings include information which is definitive in nature and is thus associated with the description not only to facilitate understanding thereof, but also to contribute, where appropriate, to the definition of the invention.

Figure 1A:
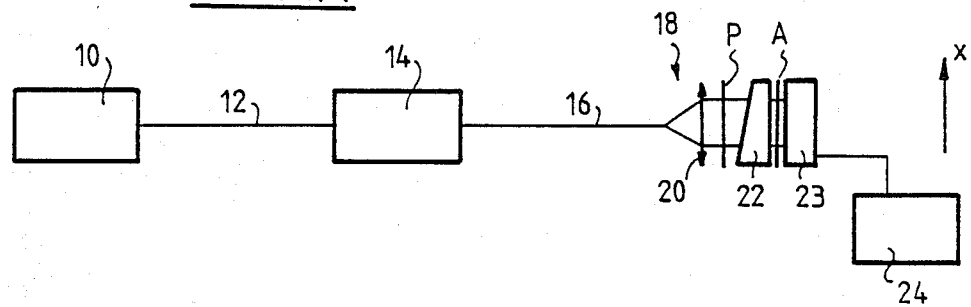
FIG. 1A is a block diagram of a device in accordance with the invention.
Figure 1B:
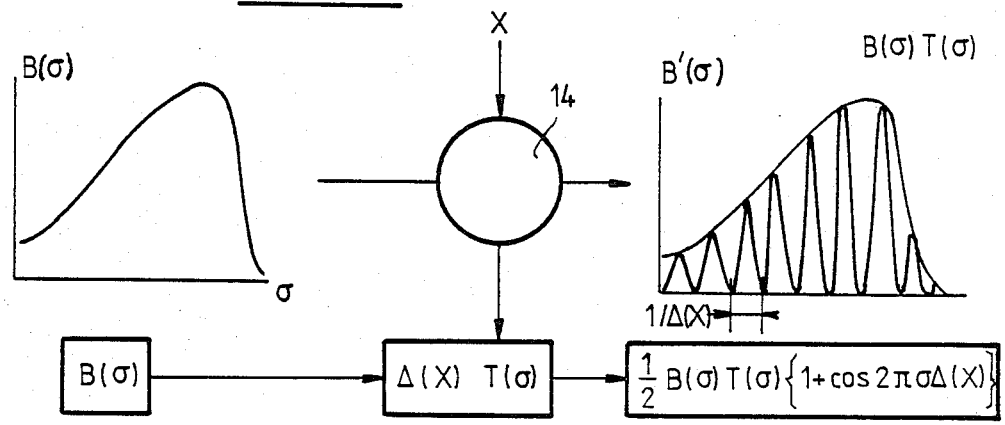
FIG. 1B is a diagram showing the operating principle of a spectrum modulation encoding sensor.
Figure 2:
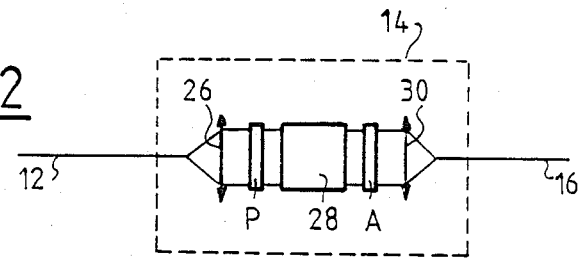
FIG. 2 shows an embodiment of a spectrum modulation encoding sensor.
Figure 3:
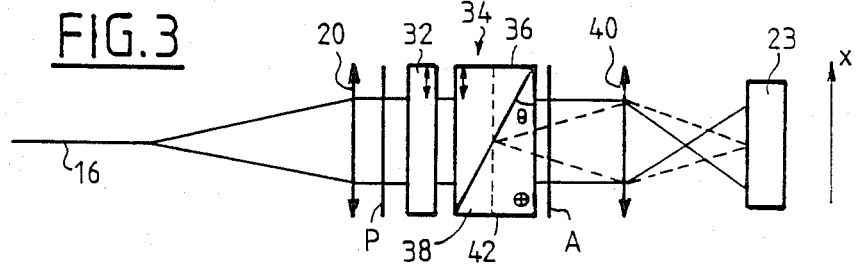
FIG. 3 shows an embodiment of a demodulation system in accordance with the invention.

Reference is made initially to FIGS. 1 to 3 for explaining the essential characteristics and the general operating principle of a device in accordance with the invention.

The device shown in FIG. 1A comprises a source 10 of incoherent light such as a filament lamp, a light-emitting diode (LED), or a set of LEDs, which is connected via an emission optical fiber 12 to a spectrum modulation encoding sensor 14 which is subjected to the physical magnitude to be measured. The sensor 14 is connected by a reception optical fiber 16 to a static demodulation system 18 comprising, in succession: collimator optics 20 with the end of the reception fiber 16 being located at the focus thereof, thereby producing a parallel light beam which passes through a polarizer P prior to engaging a prism 22 for obtaining a birefringence gradient along a privileged optical direction x, with an analyzer A being placed between the prism 22 and a multipoint linear detector 23 which is constituted by a series of photosensitive elements disposed along a line running parallel to the direction x. The polarizer P and the analyzer A are oriented relative to each other so as to be parallel or perpendicular, and are both inclined at 45° relative to the direction x. The, or each, output from the detector 23 is connected to a set of electronic circuits 24 for acquiring and processing the signals produced by the detector.

The structure of the spectrum modulation encoding sensor 14 is shown in FIG. 2. This sensor comprises collimator optics 26 having the end of the emission fiber 12 placed at the focus thereof, thereby producing a parallel light beam which is applied via a polarizer P to a plate 28 of uniaxial birefringent material which is cut parallel to its axis and whose birefringence is a function of the magnitude to be measured. The light transmitted by the birefringent plate 28 is taken up by an analyzer A and then by outlet optics 30 which apply it to the end of the reception fiber 16.

The birefringent plate 28 is of thickness e and is characterized by a slow axis of index nL and a fast axis of index nR. The polarization direction is at an angle of 45° to the slow axis and the polarizer-analyzer assembly is disposed in a crossed configuration or in a parallel configuration. The light flux transmitted by the sensor 14 is subjected to spectrum modulation insofar as the path length difference $\Delta$ which it provides is greater than the coherence length of the light source 10 used, as given by the following equation:

$$\Delta = e(nL - nR) = e(X)[nL(\sigma, x) - nR(\sigma, x)]$$

where X is the physical magnitude to be measured and $\sigma$ is the wave number.

The operation of the sensor 14 is illustrated diagrammatically by FIG. 1B. In this figure, $B(\sigma)$ represents the spectrum of the incident signal at the sensor which is subjected to the magnitude X to be measured. The sensor 14 is a two-wave interferometer device capable of applying a path length difference between its two waves which varies as a function of the magnitude to be measured. The sensor 14 therefore transmits a spectrum whose envelope is $B(\sigma) \cdot T(\sigma)$, where $T(\sigma)$ designates the transmission of the sensor, and a sinusoidal periodic modulation is added thereto at a frequency $\Delta(X)$. The light flux transmitted by the sensor is expressed by the following equation:

$$B'(\sigma, X) = \tfrac{1}{2} B(\sigma) \cdot T(\sigma)[1 + \cos 2\pi \Delta(X)]$$

This light flux is transmitted by the fiber 16 to the static demodulation system 18 which performs a Fourier transform by optical means on this light flux. Putting:

$$F(\sigma) = \tfrac{1}{2} B(\sigma) T(\sigma)$$

then the light flux at the output from the demodulation system satisfies the following expression:

$$I(D) = \tfrac{1}{4}[\widetilde{F}(0) + \widetilde{F}(D) + \tfrac{1}{2}\widetilde{F}(D-\Delta) + \tfrac{1}{2}\widetilde{F}(D+\Delta)]$$

where F(D) designates the cosine fourier transform of $F(\sigma)$, and D is the path length difference in the demodulation system.

This provides three responses whose spatial extent is inversely proportional to the bandwidth of the light source, and which are centered on path length differences, 0, $+\Delta$, $-\Delta$.

The position of the 0 response is related solely to the instantaneous operation of the detection module. The relative positions of the lateral responses $+\Delta$ and $-\Delta$ make it possible to acquire the instantaneous path length difference in the sensor 14 and thus the value of the physical magnitude X.

In theory, the optical fibers 12 and 16 are multimode step index or gradient index fibers. However, it would also be possible to use a monomode fiber, in particular if the light source 10 is a light-emitting diode or a super light-emitting diode.

Depending on the operating mode of the sensor 14 (operating in transmission or by reflection), the fibers 12 and 16 are either separate (as shown in FIGS. 1A and 2) or else partially constituted by a single fiber with the reception fiber 16 separating from the emission fiber 12 by means of a Y-coupler for connection to the demodulation system. In this system, the multipoint detector 23 may be constituted, for example, by a linear assembly of photodiodes having independent outputs (e.g. PIN diodes or avalanche diodes), or else by a grid of CCD type photodiodes providing a common video output.

FIG. 3 is a diagram of a preferred embodiment of the static demodulation system in accordance with the invention. In this embodiment, the reception optical fiber 16 is coupled by the collimator optics 20 to the polarizer P which is followed by a tuning plate 32 of birefringent material which is strictly identical from the points of view of constitution and thickness to the plate 28 in the sensor 14. This tuning plate 32 is followed by a Wollaston type prism 34 which is constituted by two elementary prisms 36 and 38 which are glued together over a sloping face at an angle $\theta$ with the privileged optical direction x, with these two prisms being birefringent and disposed in crossed manner, i.e. the slow axis of the prism 36 is the same as the fast axis of the prism 38. In the center of the field (x=0), the thicknesses of the two prisms are equal. The slow axis of the tuning plate 32 has the same orientation as the slow axis of the prism 36. The analyzer A placed after the prism 34 is followed by correction optics 40 for applying the light transmitted by the prism 34 onto the detector 23. The polarization direction is at an angle of 45° with the neutral axes of the tuning plate 32 and, as mentioned above, the polarizer-analyzer assembly is disposed in a crossed configuration or in a parallel configuration.

The path length difference D introduced by this demodulation system is given by the following equation:

$$D(x) = (nL - nR)(e + 2x \cdot \tan \theta)$$

and therefore varies linearly as a function of x (with e being the thickness of the tuning plate 32).

It can thus be seen that this path length difference is zero at the center of the field (x=0) when the tuning plate 32 is removed from the demodulation system. Thus, it is possible to use the multipoint detector 23 to record the shape and the position of the central spectrum O, in order to obtain detection zero. Further, when the tuning plate 32 is identical to the plate 28 in the sensor 14, the path length difference in the center of the field is comparable to the path length difference in the sensor 14. Under these conditions, the multipoint detector 23 can be used statically to record the shape and the position of the lateral response $+\Delta$. This position, denoted $x_1$, is such that:

$$\Delta(X) = D(x_1), \text{ whence } x_1 = 1/k[\Delta(X) - D(0)]$$

If D(0) is known and stable, it is possible by using the multipoint detector 23 to measure the value of $x_1$ to acquire the value of the magnitude X, and this can be done in a manner which is entirely static.

Figure 4:
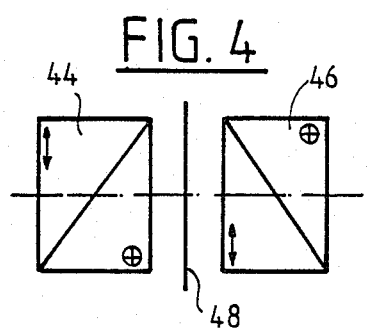
FIGS. 4, 5, and 6 show variant embodiments of the birefringence gradient prism of the demodulation system.

In the static demodulation system of FIG. 3, the interference fringes obtained are equidistant straight lines which are parallel to the edges of the prisms 36 and 38, and which are located inside the prism 34, with the surface 42 on which they are located being a plane inclined at $2\theta/3$ relative to the outside faces. The correction optics 40 serves to form an image of this field on the multipoint detector 23. However, in some cases, the slope of the localization surface 42 may be a source of difficulty. This can be avoided by replacing the single prism 34 by a set of two prisms 44 and 46 (FIG. 4) which are disposed symmetrically about a halfwave plate 48, with the prism 44 being identical to the prism 34 of FIG. 3. The interference fringe localization surface is then a plane parallel to the faces of the prisms 44 and 47. However, it is necessary for the halfwave plate 48 to be achromatic over the entire spectrum width of the light source 10, which encourages the use of LEDs in this case.

Figure 5:
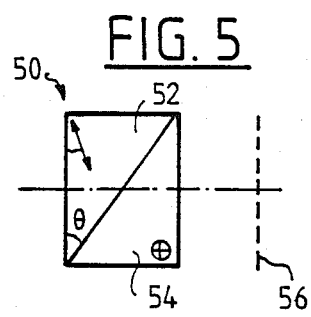

FIG. 5 shows another embodiment of the FIG. 3 birefringence gradient prism 34. In this embodiment, the prism is given an overall reference 50 and comprises, like the prism 34, two elementary prisms 52 and 54 which are joined together along a sloping face at an angle $\theta$ with a direction x, with one of these elementary prisms (52) being cut to have an axis sloping at an angle $\epsilon$ relative to its inlet face. In this case, the inteference fringe localization plane 56 is situated outside the prism 50 and may be brought into coincidence with the line of photosensitive elements in the multipoint detector 23 without there being any need to use correction optics.

Figure 6:
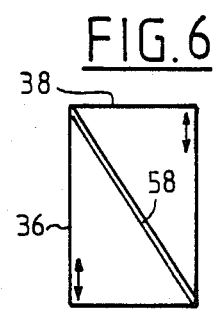

Another embodiment of the birefringence gradient prism is shown in FIG. 6. In this variant, the two elementary prisms 36 and 38 have the same orientation and they are separated by a halfwave plate 58. This assembly provides a large-field device making it possible to use short focal length collimation optics.

Figure 7A:
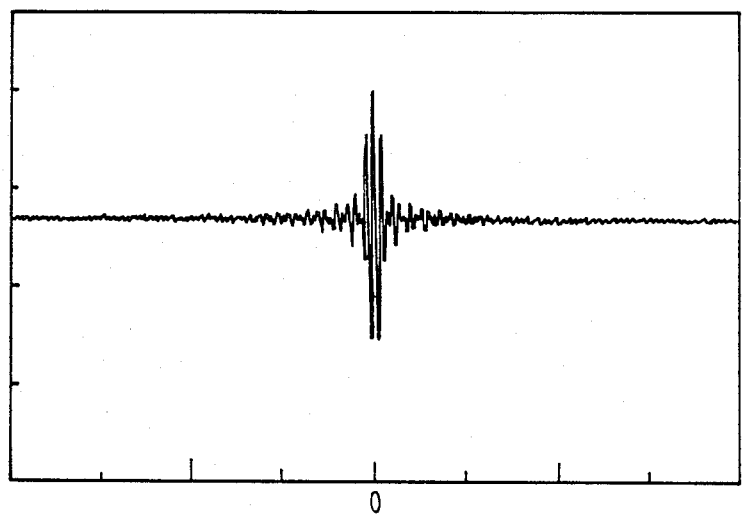
FIGS. 7A and 7B are graphs diagrammatically representative of the form of the correlation signals obtained for two different types of incoherent light source.
Figure 7B:
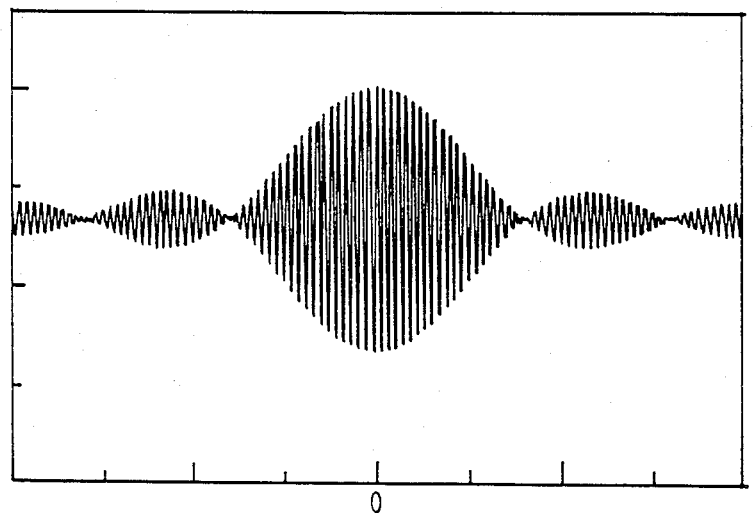

The appearance of the signals obtained at the output from the demodulation system is shown in FIGS. 7A and 7b for two different types of light source having uniform spectrum density over a band of width $\Delta\lambda$ about a central wavelength $\lambda 0$. The signal in FIG. 7A corresponds to a light source having a large spectrum width, such as a filament lamp, for which $\lambda 0$ is 800 nm and the ratio $\lambda 0/\Delta\lambda$ is equal to 2, for example. The FIG. 7B signal corresponds to a light source having a narrower spectrum width, e.g. an LED, with the central wavelength $\lambda 0$ being equal to 800 nm and the ratio $\lambda 0/\Delta\lambda$ being equal to 2. The function corresponding to the curves of FIGS. 7A and 7B can be expressed as follows:

$$I(u) = I_0 \left[ 1 + \tfrac{1}{2} \cos 2\pi u \, \frac{\sin(\pi u/f)}{\pi u/f} \right]$$

where $u\lambda 0 = D - \Delta$ and $f = \lambda 0/\Delta\lambda$.

The physical magnitude X is measured by accurately determining the position of the point $u=0$ on the detector 23. For a light source having a wide centrum width, this amounts to identifying the position of the maximum of the FIG. 7A curve, which is easy to do given the particularly narrow shape of the correlation peak.

When the light source has narrower spectrum width (the FIG. 7B curve), this determination is more difficult to perform. This difficulty can be avoided by measuring the absolute phase of the signal at any point, and then using one of the following as the measurement parameter:

either the absolute phase of the signal at a fixed point of the detector 23, with the origin of phase measurement being selected to be the maximum of the correlation peak;

or else the instantaneous position of the zero phase point.

Such phase measurement is made possible by the high value of the fineness parameter f. In one full modulation cycle, the amplitude variation of the envelope in the FIG. 7B curve does not exceed 3% which is negligible to a first approximation, and which may be compensated to a second approximation by assuming linear variation.

Phase may be measured in various different ways, for example:

(a) by direct analysis of the entire signal recorded by the detector 23: in this case various elementary photodectors in the detector 23 participate in the measurement of each point, thereby enabling the phase at the detection origin to be detected by a method of the under-sampling type; or (b) phase stepping interferometry which consists in successively recording n intensity distributions corresponding to the same correlation peak after shifting through $2\pi/n$.

For example, for $n=4$, the following succession of equations is obtained at a given point u in the fringe field:

$$I_0(u) = I_0[1 + \tfrac{1}{2} \cos 2\pi u \, \sin(\pi u/f)/(\pi u/f)]$$

$$I_1(u) = I_0(u + \tfrac{1}{4}) \approx I_0[1 + \tfrac{1}{2} \sin 2\pi u \cdot \sin(\pi u/f)/(\pi u/f)]$$

$$I_2(u) = I_0(u + \tfrac{1}{2}) \approx I_0[1 - \tfrac{1}{2} \cos 2\pi u \cdot \sin(\pi u/f)/(\pi u/f)]$$

$$I_3(u) = I_0(u + \tfrac{3}{4}) \approx I_0[1 - \tfrac{1}{2} \sin 2\pi u \cdot \sin(\pi u/f)/(\pi u/f)]$$

$$(I_1 - I_3)^2 + (I_0 - I_2)^2 = \left[ \frac{\sin(\pi u/f)}{\pi u/f} \right]^2 = F(u)$$

$$2\pi u = \arctan(I_1 - I_3)/(I_0 - I_2) = \phi(u)$$

The position $u_0$ within the fringe field can be determined by calculation by finding where the following two conditions are satisfied simultaneously:

$F(u0)$ is maximum, and $\phi(u0)$ is a multiple of $2\pi$.

If the measurements of the envelope $F(u)$ are sufficiently accurate, the position $u_0$ is unique and defines the center of the correlation peak $D = \Delta$.

(c) phase scanning interferometry which consists in recording the signals resulting from a linear variation in phase by $2\pi$:

either by integrating them over intervals of $2\pi/n$ by means of a multipoint detector 23 of the integrator type (CCD charge transfer cells);

or else in analyzing them over time by means of a grid of photodiodes having individual outputs and operating in tracking mode.

Method (a) has the major advantage of being entirely static. However, it assumes that the opto-electronic characteristics of each elementary detector are stable and known.

Method (b) is performed by placing a set of n phase shifting plates (where n is not less than 3) having the same axes and analogous constitution ahead of the birefringence gradient prism of the demodulation system. The plates are easily interposed by a translation motion or by a rotary motion, for example the plates may be mounted in housings in a rotary disk as shown diagrammatically in FIG. 9A, by way of example.

There are numerous ways of implementing method (c). FIG. 8 is a diagram showing a preferred implementation of this method, as described by A. Robert and C. Cinotti in the article entitled "Application de biréfringent tournant à une nouvelle méthode de Moiré" (i.e. Application of rotary birefringennce to a new Moiré method) published in Opto 80, Sept. 30-Oct. 2, 1980. This device comprises a halfwave plate 60 rotating about the optical axis of the system, and a fixed quarterwave plate 62, these two plates being interposed between the polarizer P and the tuning plate 32 of the FIG. 3 demodulation system, with one of the axes of the quarterwave plate 62 coinciding with the polarization direction defined by the polarizer P. If an integrating type multipoint detector 23 is used, then the integration time T must satisfy the equation:

$$n\Omega T = 2\pi$$

where n is an integer, and $\Omega$ is the constant angular frequency of the rotary motion of the plate 60, thereby recreating conditions which are formally similar to those of method (b).

In accordance with another important characteristic of the invention, a plurality of spectrum modulation encoding sensors 14 (which by their very nature are multiplexable devices) may be interrogated by a single demodulation system. This can be done by switching different birefringent plates corresponding to the different plates used in the various sensors upstream from the birefringence gradient prism. The multipoint detector 23 then successively records the +1 order correlation peaks associated with the various sensors in order to deduce the corresponding $x_1$ positions and thus the instantaneous values of the physical magnitudes X at the locations of the various sensors.

This multiplexing may be performed by using one or other of the devices shown diagrammatically in FIGS. 9A, 9B, and 9C.

The FIG. 9A device comprises a disk 64 which is mounted to rotate about an axis parallel to the optical axis of the demodulation system and which has n housings 66 each of which contains a birefringent plate 68 equivalent to the birefringent plate in one of the spectrum modulation encoding sensors, together with an additional housing 70 which is left empty. This empty housing 70, is used at regular intervals to record the shape and the position of the central correlation peak in order to continuously reset the detection zero point.

FIG. 9B shows a variant embodiment in which each birefringent plate 68 of a housing 66 in the disk 64 is replaced by a shared field plate 72 for simultaneously obtaining both the 0 and the +1 correlation peaks on the detector as required for measurement. This shared field plate 72 is constituted, for example, by a circular plate 74 of thickness e/2, a complementary semicircular plate 76 of thickness e/2 having the same orientation as the plate 74 (i.e. their slow axes coincide), and an anti-complementary semicircular plate 78 of thickness e/2 whose slow axis coincides with the fast axis of the plate 74. The two semicircular plates 76 and 78 are joined together along their diametral edge 80 which extends perpendicularly to the direction x of the detector 23 when the shared field plate 72 is in operation. Thus, the total thickness of the shared field plate 72 is equal to e via the complementary plate 76 and to zero via the anti-complementary plate 78.

FIG. 9C shows another variant embodiment in which each housing 66 of the disk 64 receives a semicircular shaped tuning plate 82 so that half of each housing 76 is left empty, with the diametral edge 84 of the plate running parallel to the direction x when in the operating position. As a result, two half fields of interference fringes are obtained and these fields are analyzed by means of two linear multipoint detectors $23_1$ and $23_2$ which are placed touching each other, either by optical methods or else, for example, by means of a beamsplitting cube, or else by mechanical methods such as by means of a two-trace detector having two superposed lines of detectors.

Naturally, instead of using the FIG. 9A disk 64, it would be possible to use a rectilinear strip displaceable in translation and having an alignment of housings therein for the different plates.

Further, it may also be advantageous, in accordance with the invention, to have a source of incoherent light whose spectrum width is modulatable, thereby making it possible to retain the advantages of simplicity and of absolute amplitude detection as applicable to FIG. 7A type signals together with the advantages of extremely high accuracy due to phase detection as applied to signals of the FIG. 7B type. To this end, the invention provides for the light source to be constituted by superposing n LEDs having different central wavelengths, for example the wavelengths shown in FIG. 10, in which wavelength is plotted along the X-axis and relative spectrum density is plotted along the Y-axis, and in which each curve corresponds to a different LED.

The light from these diodes can be superposed:

by multiplexing using their different central wavelengths;

by means of a coupler which means there is no need to take account for the effective diode wavelengths, but which gives rise to flux losses.

Spectrum profile modulation of a source constituted by superposing such diodes is obtained by adjusting the currents fed to the various diodes.

I claim:

1. An opto-electronic detection device for remotely detecting a physical magnitude, the device comprising:
   a source of incoherent light,
   an interferometric sensor subjecting the incoherent light from the source to a periodic or quasi-periodic modulation of its spectrum at a frequency which is a function of a magnitude to be measured,
   a first optical fiber connecting the source of light to the sensor with the corresponding optical path length difference in the sensor being greater than the coherence length of the source,
   a spectrum analyzing means including:
   a optical demodulation system essentially constituted by a set of birefringent elements placed between a polarizer and an analyzer which are parallel, for obtaining a birefringence gradient along a privileged optical direction x,
   a multipoint linear detector oriented parallel to the privileged optical direction and having a plurality of photosensitive elements, and electronic circuits for acquiring and processing the signals produced by the detector, the demodulation system performing a Fourier transform of the light modulated by the said magnitude in the sensor, permitting to determine the instantaneous path length difference in the sensor and thus the value of the physical magnitude to be measured, and a second optical fiber connecting the sensor to the spectrum analyzing means.

2. A device according to claim 1, wherein the sensor comprises collimator optics having the end of the first optical·fiber placed at the focus thereof and providing a parallel beam of light striking a sensor polarizer followed by a plate of single axis birefringent material cut parallel to its axis, a sensor analyzer placed downstream from the plate, and output optics having the end of the second optical fiber placed at the focus thereof.

3. A device according to claim 1, wherein the demodulation system comprises collimation optics having the corresponding end of the second fiber placed at the focus thereof and providing a parallel light beam striking the polarizer followed by the birefringent elements, the polarizer and the analyzer being inclined at 45° relative to the privileged optical direction x.

4. A device according to claim 3, wherein the birefringent elements comprises a prism of the Wollaston type constituted by two elementary birefringent prisms stuck together along a face which is inclined relative to privileged direction x and disposed in crossed manner, connection optics optionally being provided between the analyzer and the detector in order to form an image of the field of interference fringes thereon.

5. A device according to claim 4, wherein the interferometric sensor comprises a plate of birefringent material and the demodulation system comprises also a plate of birefringent material identical to that of the interferometric sensor, placed between the polarizer and the prism with its slow axis being oriented in the same way as the slow axis of the first elementary prism of the Wollaston type prism.

6. A device according to claim 3, wherein the demodulation system comprises two birefringent prisms of the Wollaston type, which prisms are disposed symmetrically about a halfwave plate which is achromatic over the spectrum width of the light source in order to obtain a localization plane for the field of fringes which is parallel to the faces of the prisms.

7. A device according to claim 4, wherein one of the elementary prisms of the Wollaston type prism is cut with an axis that slopes relative to its inlet face.

8. A device according to claim 4, wherein both elementary prisms of the Wollaston type prism are identically oriented and are separated by a halfwave plate placed between their stuck-together faces.

9. A device according to claim 1, 2, 3, 4 or 5 wherein a phase modulation device is disposed between the polarizer and the birefringent elements of the demodulation system.

10. A device according to claim 9, wherein phase modulation device comprises a halfwave plate rotating about the optical axis of the demodulation system, and a fixed quarterwave plate having one of its axes coinciding with the polarization direction associated with the polarizer.

11. A device according to claim 9, wherein the phase modulation device comprises a set of n phase shifting plates with an increment of $2\pi/n$, together with means for causing said plates to move successively between the polarizer and the birefringent elements in the demodulation system.

12. A device according to claim 1, 2, 3, 4 or 5 wherein a plurality of spectrum modulation encoding sensors each having a birefringent plate are connected to the source of light by way of the first optical fiber and to the demodulation system by way of the second optical fiber and multiplexed by optical path differences they provide, the device further comprising a set of birefringent plates which are identical to those in the plurality of spectrum modulation encoding sensors and which are placed in the demodulation system between the polarizer and the birefringent elements and which are associated with means for causing the plates to be moved successively between the polarizer and the set of birefringent elements.

13. A device according to claim 12, wherein the birefringent plates are placed in housings in a disk mounted to rotate about an axis which is parallel to the optical axis of the demodulation system, said disk including an empty housing.

14. A device according to claim 12, wherein each birefringent plate is a shared field plate comprising a circular base plate having two semicircular plates of the same thickness at the base plate applied thereto, with one of the semicircular plates having the same orientation as the base plate and the other of the semicircular plates having the opposite orientation, the join line between the two semicircular plates being perpendicular to the privileged optical direction x.

15. A device according to claim 12, wherein each birefringent plate is a semicircular plate whose diametral edge extends radially relative to the optical axis of the demodulation system to lie parallel to the privileged direction x, and in that two multipoint linear detectors are disposed touching each other to analyze the two half fields of interference fringes.

16. A device according to claim 1, 2, 3, 4 or 5 wherein the light source is of modulatable spectrum width and is constituted by superposing a plurality of LEDs having different central wavelengths, with the spectrum width of the source being modulated by adjusting feed currents to the LEDs.

* * * * *